US012354580B2

(12) United States Patent
Jordan

(10) Patent No.: US 12,354,580 B2
(45) Date of Patent: Jul. 8, 2025

(54) SOUND PICKUP FOR STRINGED INSTRUMENTS

(71) Applicant: Stefan Jordan, Ennepetal (DE)

(72) Inventor: Stefan Jordan, Ennepetal (DE)

( * ) Notice: Subject to any disclaimer, the term of this patent is extended or adjusted under 35 U.S.C. 154(b) by 640 days.

(21) Appl. No.: 17/693,318

(22) Filed: Mar. 12, 2022

(65) Prior Publication Data

US 2022/0246123 A1 Aug. 4, 2022

Related U.S. Application Data

(63) Continuation of application No. PCT/EP2020/078651, filed on Oct. 12, 2020.

(30) Foreign Application Priority Data

Oct. 22, 2019 (DE) ......................... 102019128545.3

(51) Int. Cl.
*G10H 3/18* (2006.01)
*G10H 3/14* (2006.01)

(52) U.S. Cl.
CPC ............. *G10H 3/181* (2013.01); *G10H 3/143* (2013.01); *G10H 3/183* (2013.01); *G10H 2220/505* (2013.01); *G10H 2220/511* (2013.01); *G10H 2220/515* (2013.01)

(58) Field of Classification Search
CPC ........ G10H 3/181; G10H 3/143; G10H 3/183; G10H 2220/505; G10H 2220/511; G10H 2220/515
USPC ........................................................... 84/726
See application file for complete search history.

(56) References Cited

U.S. PATENT DOCUMENTS

| | | | | | |
|---|---|---|---|---|---|
| 2,089,171 | A * | 8/1937 | Beauchamp | G10H 3/181 | 984/368 |
| 2,612,541 | A * | 9/1952 | De Armond | G10H 3/181 | 335/229 |
| 3,535,968 | A * | 10/1970 | Rickard | G10H 3/183 | 84/727 |
| 5,378,850 | A * | 1/1995 | Tumura | G10H 3/26 | 84/738 |
| 5,508,474 | A * | 4/1996 | Tumura | G10H 3/181 | 84/727 |
| 5,911,171 | A * | 6/1999 | Wong | G10H 3/185 | 84/DIG. 24 |

(Continued)

FOREIGN PATENT DOCUMENTS

| | | |
|---|---|---|
| DE | 970536 | 9/1958 |
| DE | 970536 C * | 9/1958 |

(Continued)

*Primary Examiner* — Christina M Schreiber
(74) *Attorney, Agent, or Firm* — Von Rohrscheidt Patents

(57) ABSTRACT

A sound pickup for a stringed instrument, the sound pickup including a housing arranged at a body of the stringed instrument below strings, wherein the housing includes at least one magnet enveloped by a coil so that a magnetic field is generatable by the at least one magnet, wherein the coil is electrically connected with at least one amplifier and with at least one speaker so that a movement of the strings in the magnetic field generates an electrical current in the coil, wherein the sound pickup includes an arrangement configured to adjust the magnetic field of the magnet which causes an adjustment of sound characteristics of the instrument.

9 Claims, 5 Drawing Sheets

(56) References Cited

U.S. PATENT DOCUMENTS

| | | | | | |
|---|---|---|---|---|---|
| 5,932,827 | A * | 8/1999 | Osborne | G10H 3/18 84/738 |
| 8,907,199 | B1 * | 12/2014 | Dixon | G10H 3/181 84/743 |
| 2006/0156911 | A1 * | 7/2006 | Stich | G10H 3/181 84/726 |
| 2008/0245217 | A1 * | 10/2008 | Stewart | G10H 3/181 84/727 |
| 2014/0245877 | A1 * | 9/2014 | Gelvin | G10H 3/181 84/727 |
| 2014/0373701 | A1 * | 12/2014 | Yaron | G10H 3/143 84/726 |
| 2015/0027300 | A1 * | 1/2015 | Wolf | G10H 3/181 84/726 |
| 2016/0027422 | A1 * | 1/2016 | Baker | G10D 1/085 84/726 |
| 2018/0010212 | A1 | 4/2018 | Shaw et al. | |
| 2018/0102121 | A1 * | 4/2018 | Shaw | G10H 3/182 |
| 2018/0197518 | A1 * | 7/2018 | Ma | G10H 3/181 |
| 2022/0246123 | A1 * | 8/2022 | Jordan | G10H 3/181 |

FOREIGN PATENT DOCUMENTS

| | | | | |
|---|---|---|---|---|
| DE | 4238837 | A1 * | 5/1993 | G10H 3/181 |
| DE | 202011107036 | U1 * | 3/2012 | G10H 3/181 |
| EP | 0527654 | A2 * | 2/1993 | |
| GB | 2252859 | A * | 8/1992 | G10H 3/181 |
| JP | H0573061 | A * | 3/1993 | |
| JP | 2021510423 | A * | 4/2021 | |
| KR | 20050053262 | A * | 6/2005 | |

* cited by examiner

PRIOR ART

SOUND PICKUP FOR STRINGED INSTRUMENTS

RELATED APPLICATIONS

This application is a continuation of International Patent Application PCT/EP2020/078651 filed on Oct. 12, 2020 claiming priority from German Patent Application DE 10 2019 128 545.3 filed on Oct. 22, 2019 both of which are incorporated in their entirety by this reference.

FIELD OF THE INVENTION

The invention relates to a sound pickup for stringed instruments.

BACKGROUND OF THE INVENTION

Generic sound pickups are well known in the art. Conventionally, an increase or decrease of the magnetic flux between the strings and the sound pickup causes changes in an output signal of the sound pick up and thus sound changes.

When sound changes are desired, they are conventionally accomplished by replacing the sound pickup which is complex and expensive and may not even achieve the desired sound change.

It is also known in the art that metal covers of magnet sound pickups cause an attenuation in higher frequency ranges due to eddy currents. Sometimes therefore the covers are omitted or covers with recesses and cut outs are being used or closed metal covers are installed when the attenuation effect is desirable.

BRIEF SUMMARY OF THE INVENTION

Thus, it is an object of the invention to provide a novel sound pickup for stringed instruments that facilitates implementing different sound characteristics without replacing the sound pickup.

The object is achieved by a sound pickup for a stringed instrument, the sound pickup including a housing arranged at a body of the stringed instrument below strings, wherein the housing includes at least one magnet enveloped by a coil so that a magnetic field is generatable by the at least one magnet, wherein the coil is electrically connected with at least one amplifier and with at least one speaker so that a movement of the strings in the magnetic field generates an electrical current in the coil, wherein the sound pickup includes an arrangement configured to adjust the magnetic field of the magnet which causes an adjustment of sound characteristics of the instrument.

The device according to the invention has the essential advantage of being configured to influence the magnetic field in a simple manner and being able to quickly implement a plethora of combinations of amplification and attenuation and thus implement many different sound characteristics which can even be performed while using the stringed instrument if required.

According to the solution according to the invention the device for influencing the magnetic field is formed from at least one controllable resistor or potentiometer which adjusts the magnetic field and thus sound characteristics of the instrument in a simple manner.

According to the invention the potentiometer can be regulated manually or electronically.

In another embodiment of the invention the device for influencing the magnetic field is formed from at least one additional permanent magnet, electro-magnet or at least one component made from ferro magnetic material which adjusts the magnetic field and thus the sound characteristics of the instrument through position change relative to the first permanent magnet.

Advantageously the sound characteristics are changed without any direct interference with existing circuits. This feature is particularly advantageous when the still quite popular tube amplifiers are being used. Thus, additional effect control devices are omitted. These devices are being perceived to be detrimental since they impair the typical sound characteristics that are being perceived as warm, balanced and natural. These sound characteristics are being retained in their entirety when the invention is being used.

Additionally, the object of the invention can also be achieved by a device for adjusting the magnetic field that includes a magnet whose position is adjustable within the coil.

Advantageously an over modulation of the preamplifier can be generated or if already provided, can be intensified. Thus, an overdrive or related effect devices can be omitted or their application range can be increased when implementing the invention.

Independently from the amplifier configuration that is being used and regardless of additional effect devices the invention provides a significant expansion of the ability to adjust sound characteristics, since it facilitates producing an instrument with continuously and easily adjustable sound pickup characteristics. This significantly simplifies using a single instrument for different styles of music.

Typically, the position change of the additional permanent magnet, electro magnet, or of at least one component made from ferro magnetic material is performed perpendicular to an orientation of the strings.

However, it is also possible that the position change is caused by rotating or pivoting the additional permanent magnet, electro magnet or of at least one component made from ferro magnetic material.

There is also the option to arrange the magnets or the ferro magnetic component outside or inside of the housing.

In one embodiment of the invention, the adjustment of the additional permanent magnet, electro-magnet or ferro magnetic component is performed manually, or can certainly also be performed electrically.

In another advantageous embodiment of the invention a sound pickup configured to control the attenuation is a cover of the housing oriented towards the strings of the instrument and made from electrically conductive material configured as a device for continuous adjustment of a opening condition.

This embodiment has the additional advantage that the adjustable attenuation offers additional options to adjust the sound characteristics.

The device for continuously adjusting the opening condition of the cover of the housing can include two perforated plates that are supported at a cover portion and that have aligned hole patterns, wherein the perforated plates are moved relative to each other and can thus achieve different opening conditions and attenuation effects.

It is also possible to configure the device for variably adjusting the opening condition as a metal lamella rollup blind assembly that is supported at the cover of the housing, wherein different positions of the blind lamella help to achieve different opening conditions and attenuation effects.

BRIEF DESCRIPTION OF THE DRAWINGS

The invention is now described based on advantageous embodiments with reference to drawing figures, wherein.

DETAILED DESCRIPTION OF THE INVENTION

Figure 1:
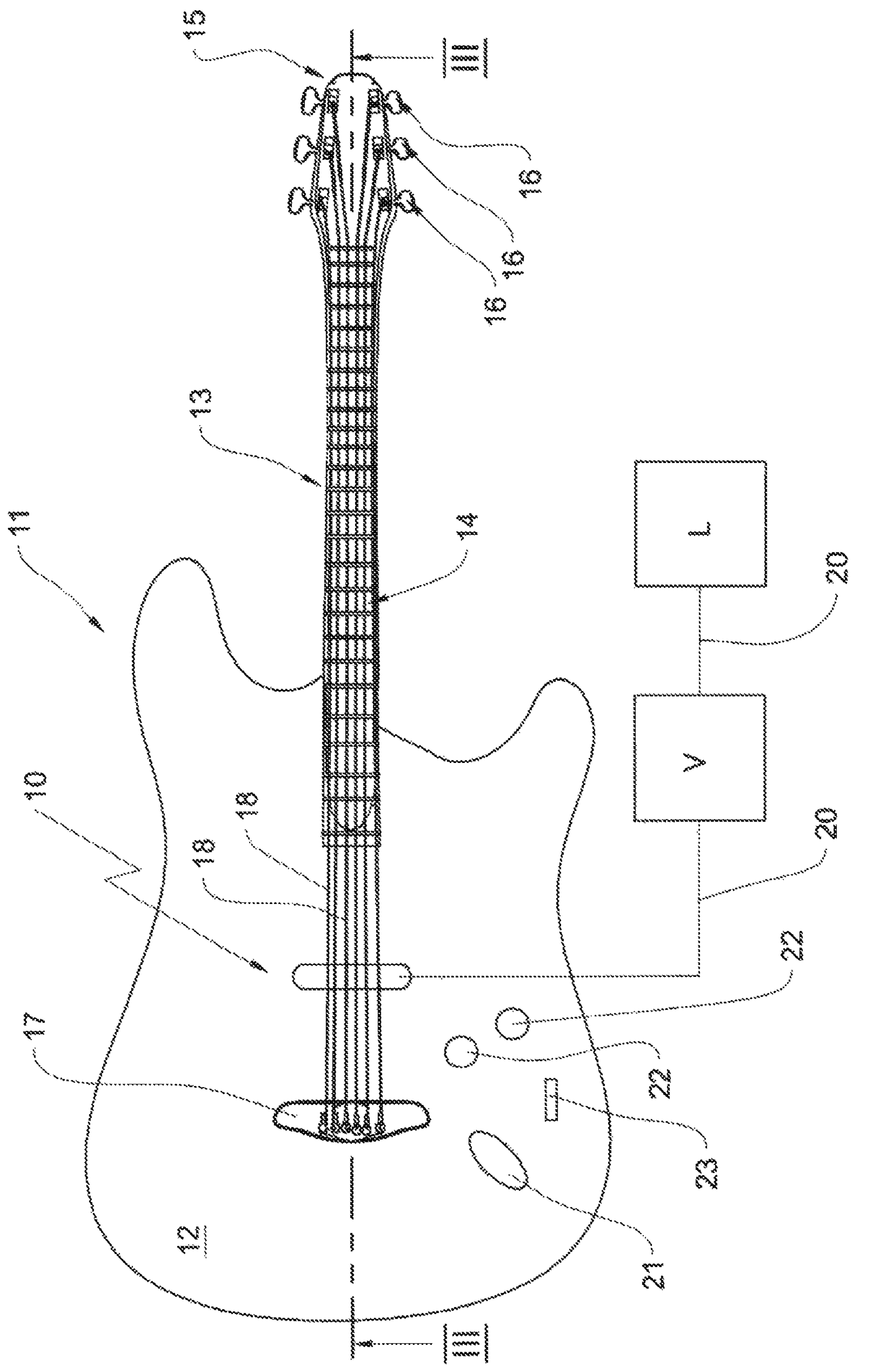
FIG. 1 illustrates a top view of an electric guitar.

The drawing figures show a sound pickup for stringed instruments overall designated with reference numeral reference 10.

FIG. 1 shows an electric guitar 11 in a top view. The electric guitar 11 includes a body 12, a neck 13 with a finger board 14 and a head plate 15 with adjustment mechanisms 16. Strings 18 are run with a tension between a bar 17 at the body 12 that supports the strings and the adjustment mechanisms 16.

Figure 3:
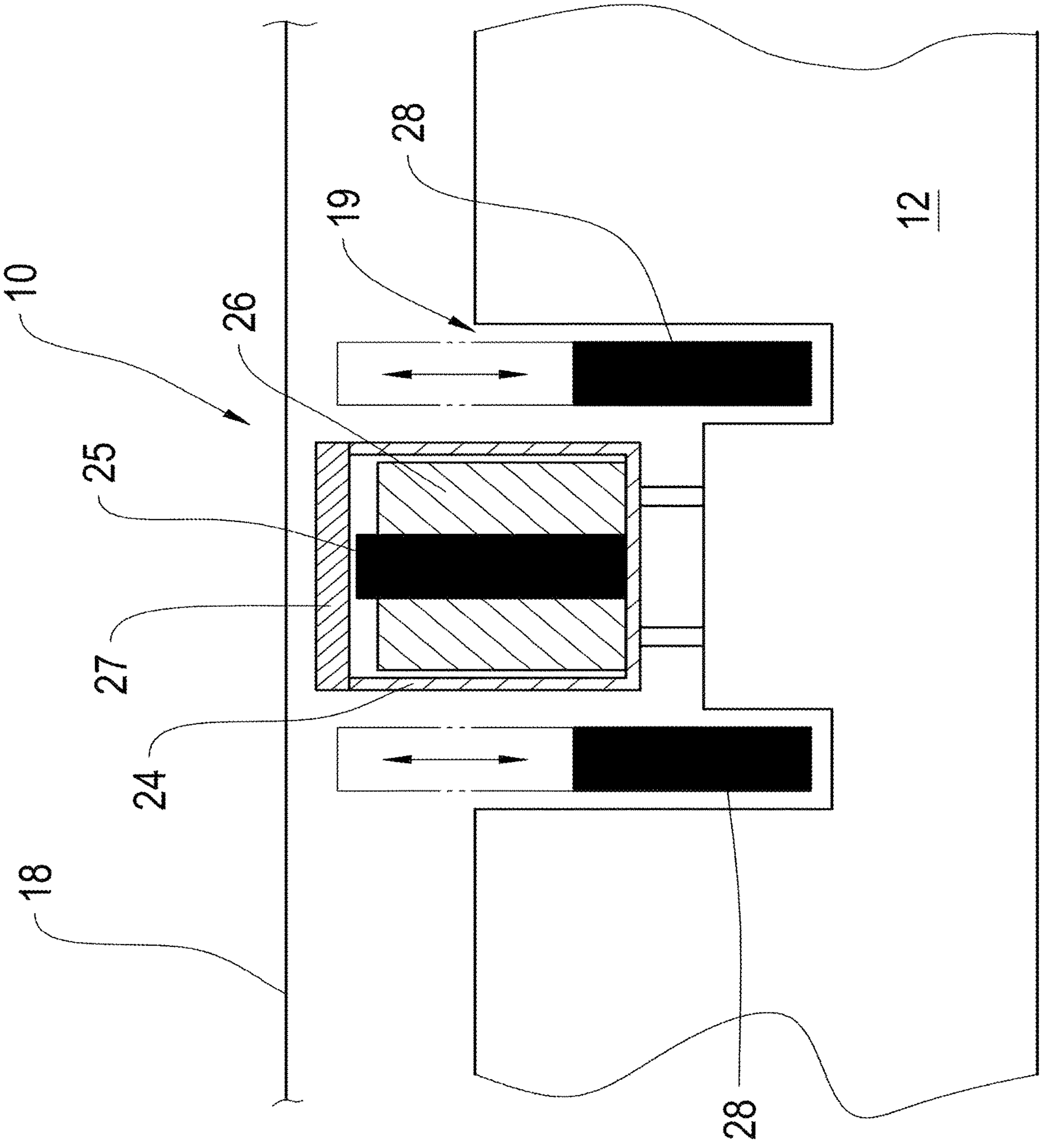
FIG. 3 illustrates a partial sectional view according to sectional line III-III in FIG. 1.
Figure 4:
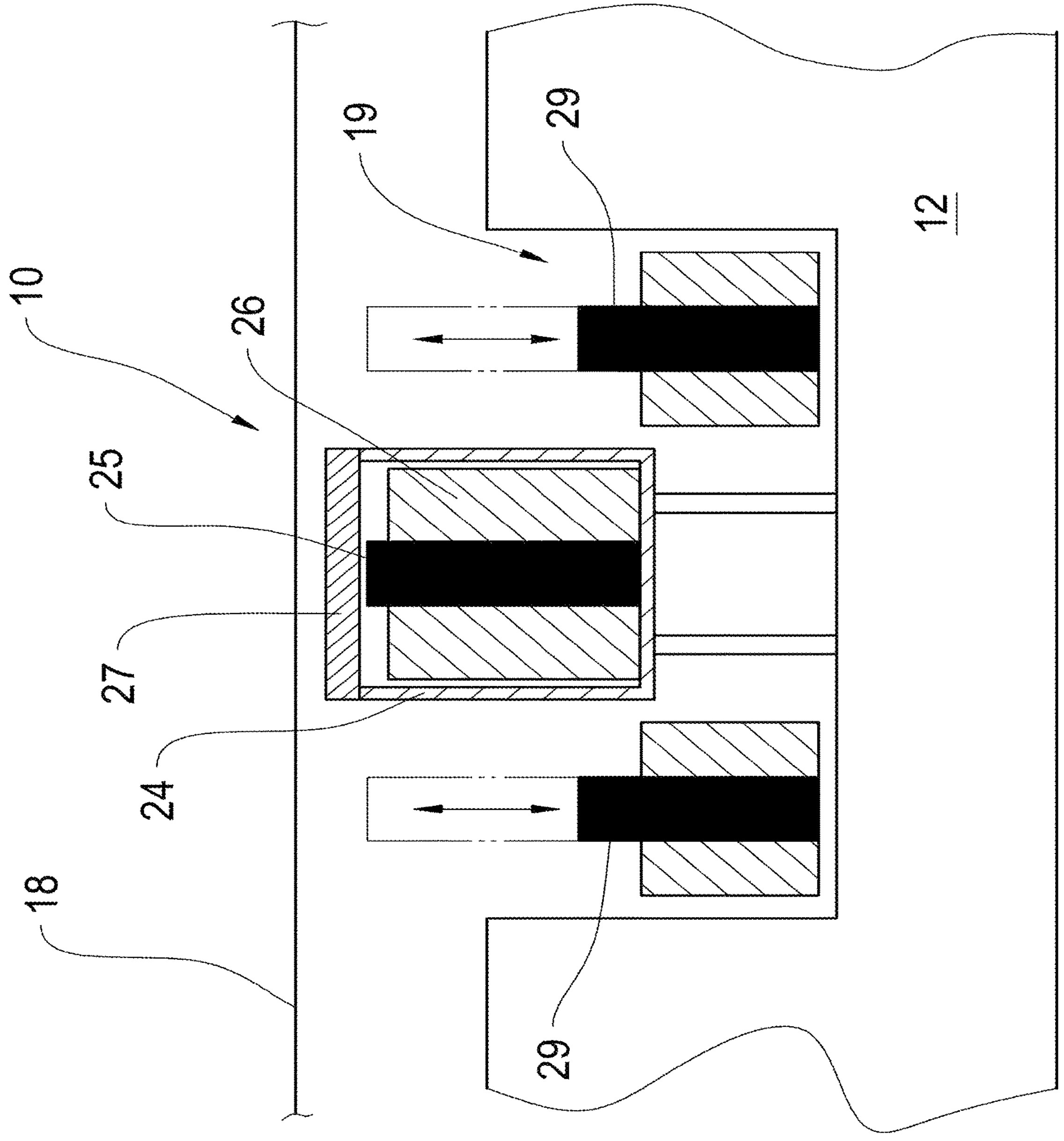
FIG. 4 illustrates a partial sectional view of another embodiment of a sound pickup with two electromagnets.

The sound pick up 10 is arranged between the bar 17 and the neck 13 in a recess 19 (c.f. FIGS. 3 and 4) of the body 12 wherein the sound pickup is connected by a cable 20 with an amplifier V and a speaker L.

Last not least a connection socket 21, a volume and sound controller 22 and a sound pickup actuator 23 is arranged on the body 12.

Figure 2:
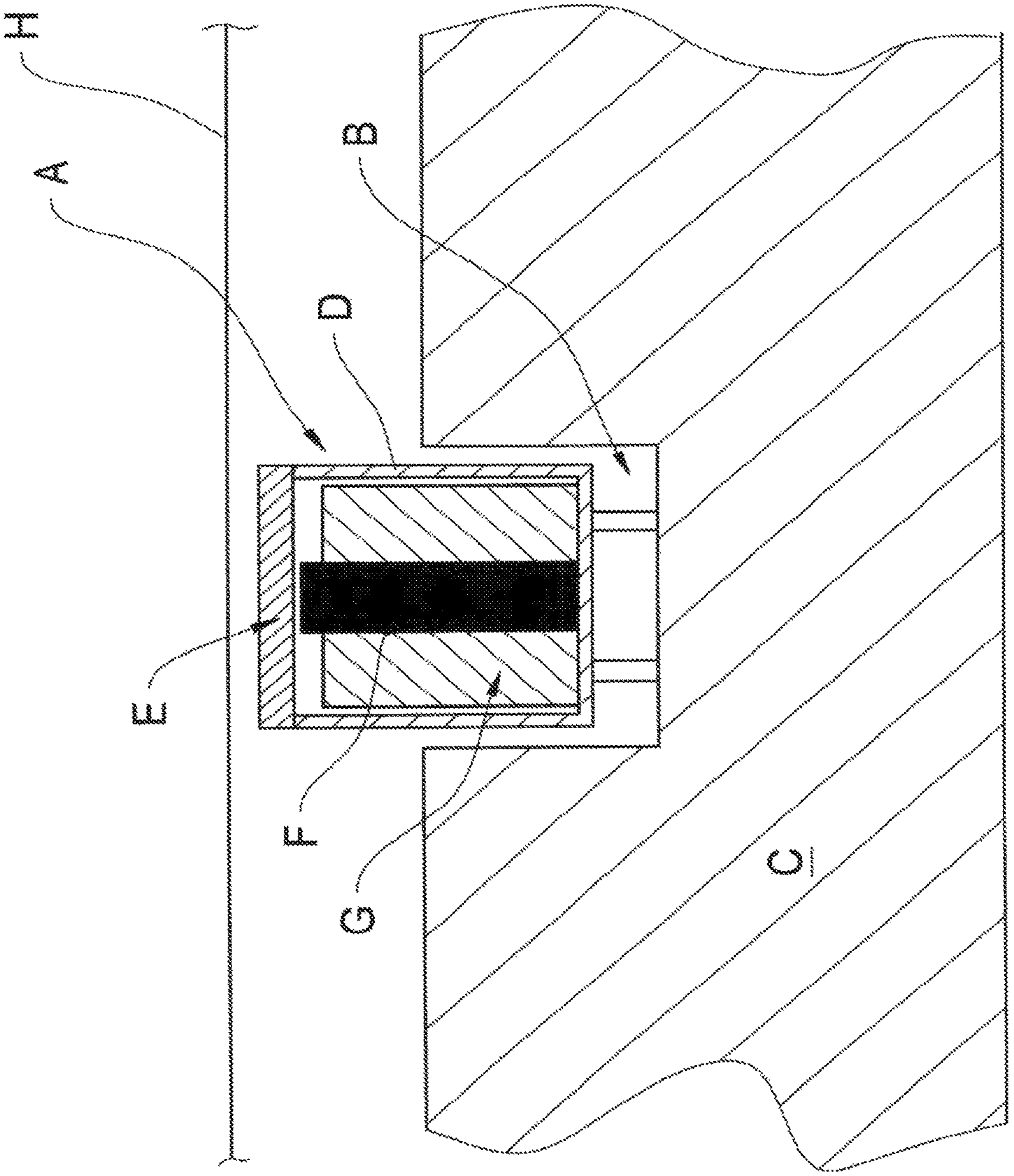
FIG. 2 illustrates a partial sectional view of a prior art sound pickup.

FIG. 2 illustrates a prior art sound pickup A. The sound pickup A is arranged in a recess B of the body C of an electric guitar. The sound pickup A includes a housing D with a cover E in which a magnet F is arranged that is enveloped by a coil G. Strings H are run above the cover.

The electromagnetic sound pickup A including the permanent magnet F and the coil G converts the string oscillations of an electric guitar into electric AC signals. In particular the movement of the strings H in the magnetic field changes a flux of the magnetic field, so that electromagnetic induction generates an alternating current with the frequency of the oscillation of the string H in the coil G. As described supra, with respect to FIG. 1 the electric signal is fed into an amplifier and then amplified into a speaker signal.

FIG. 3 illustrates a first embodiment of a sound pick up 10 according to the invention. The sound pickup 10 includes a housing 24 a magnet 25, a coil 26 that envelops the magnet 25 and a cover 27 of the housing 24. Two permanent magnets 28 are arranged on both sides adjacent to the sound pickup 10 wherein the two permanent magnets are vertically movable in the instant embodiment.

As a matter of principle, it is conceivable that the permanent magnet 28 is pivoted in a variation of this embodiment.

The position of the at least one additional magnet 28 is continuously variable by a mechanical sound pickup actuator 23 or by an electrical sound pickup actuator 23. Thus, the magnetic field generated by sound pickup 10 can be continuously amplified or attenuated since the movement of the strings 18 generates different levels of electromagnetic induction and thus a variable alternating voltage while the electric guitar is being played. This advantageously causes the different sound characteristics according to the invention.

FIG. 4 shows a sound pickup 10 similar to the embodiment according to FIG. 3, however in this case the additional magnets 28 are configured as electromagnets 29 including an ion core and a coil that are also vertically move able. Also here pivoting or rotating the electromagnets 29 is possible.

Figure 5A:
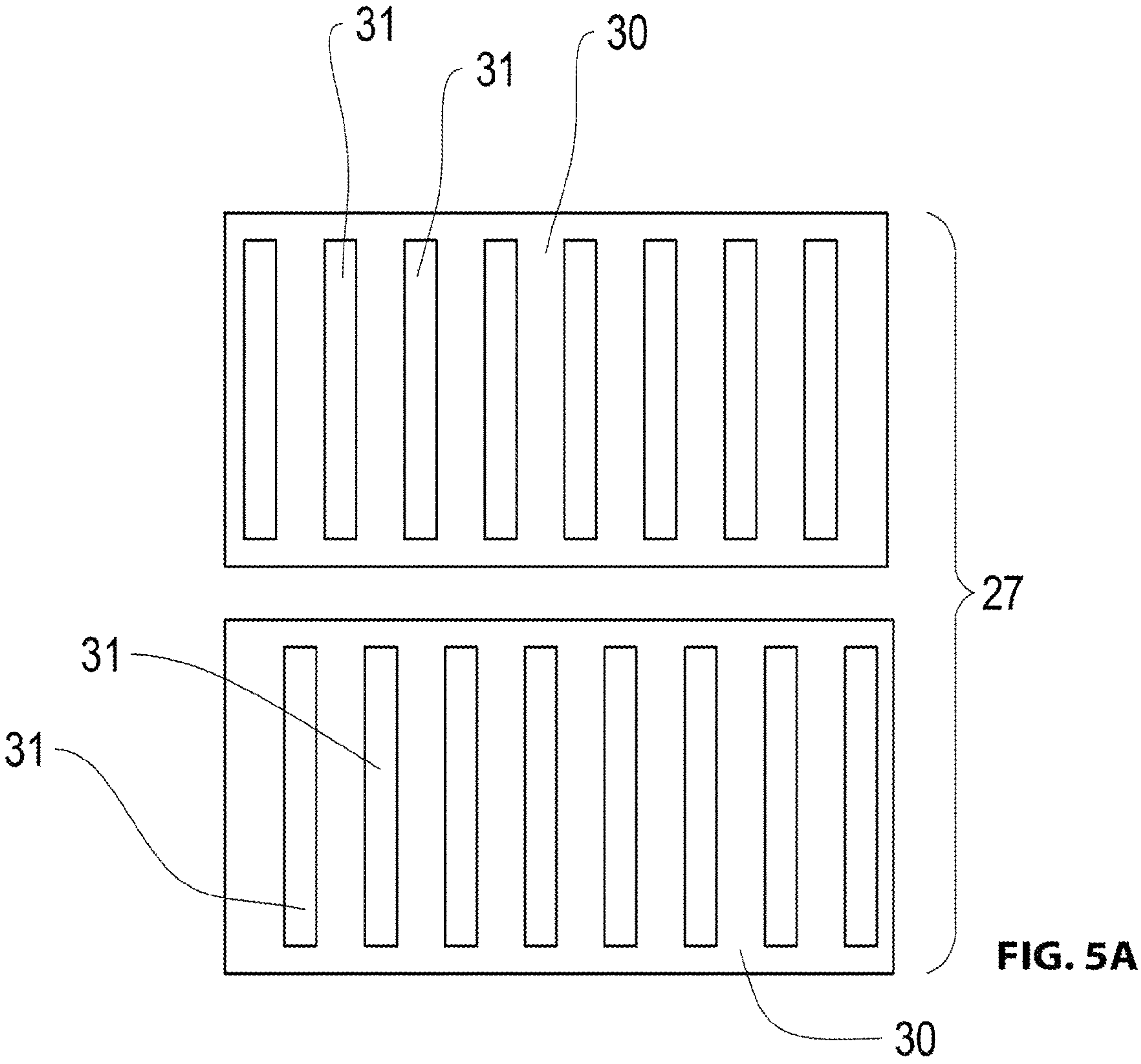
FIGS. 5A-5C illustrate views of a housing cover of a sound pick up in different positions.
Figure 5B:
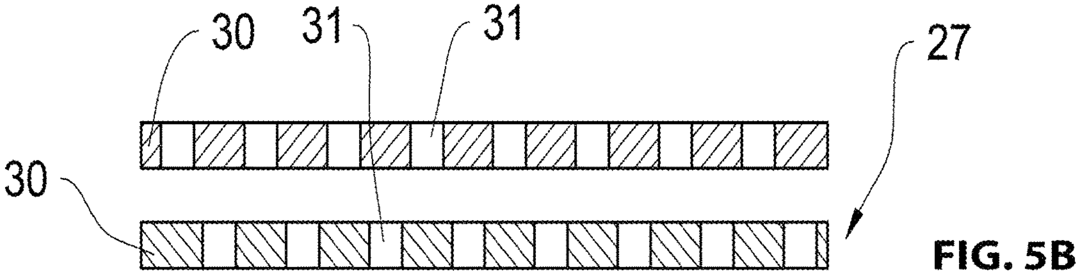
Figure 5C:
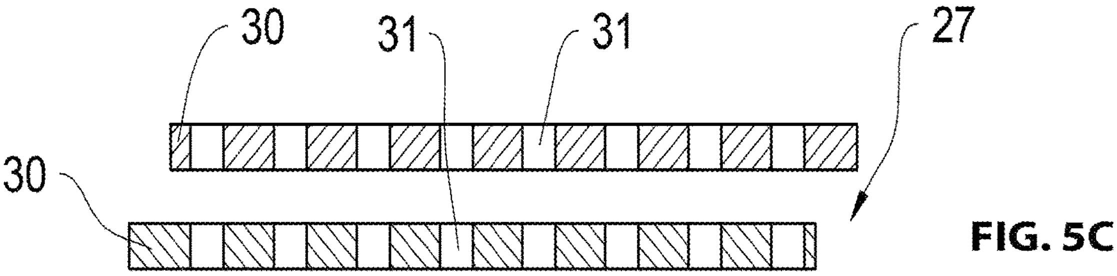

Last not least FIGS. 5A-5C show an advantageous embodiment of the cover 27 of the housing 24 implementing continuously variable control of the attenuation. Thus, the cover 27 is formed from two covers 30 that are horizontally movable relative to each other and that respectively include longitudinal slots 31. An opening condition of the housing 24 is adjustable as a function of the cover 30.

When the covers 30 are offset relative to each other the housing 24 is completely closed and a maximum attenuation is achieved.

When the longitudinal slots 31 are aligned in both covers 30 the housing 24 is open by a maximum amount and thus the attenuation is at a minimum.

Alternatively, however it is also possible that the covers 30 include hole arrangements instead of longitudinal slots 31 or that the device for variable adjustment of the opening condition is configured as a metal lamella adjustable roll up shade supported at the cover of the housing, so that different positions of the lamellae facilitate achieving different opening conditions and damping effects.

REFERENCE NUMERALS AND DESIGNATIONS

10 sound pickup
11 electric guitar
12 body
13 neck
14 finger board
15 head plate
16 adjustment mechanism
17 bar with string support
18 string
19 recess
20 cable
21 connection socket
22 volume and sound characteristics controller
23 sound pickup actuation
24 housing
25 magnet
26 coil
27 cover of housing
28 permanent magnet, additional magnet
29 electromagnet
30 cover
31 longitudinal slot
A sound pickup
B recess
C body
D housing
E cover
F magnet
G coil
H string
V amplifier
L speaker

What is claimed is:

1. A sound pickup for a stringed instrument, the sound pickup comprising:
   a housing arranged at a body of the stringed instrument below strings,
   wherein the housing includes at least one magnet enveloped by a coil so that a magnetic field is generatable by the at least one magnet,
   wherein the coil is electrically connected with at least one amplifier and with at least one speaker so that a movement of the strings in the magnetic field generates an electrical current in the coil,
   wherein the sound pickup includes an arrangement configured to adjust the magnetic field of the magnet which causes an adjustment of sound characteristics of the stringed musical instrument, and
   wherein a cover of the housing that is oriented towards the strings of the stringed musical instrument is made from electrically conductive material and includes an arrangement configured to continuously variably adjust a size of an opening of the cover which causes a continuously variable control of an attenuation of the sound pickup.

2. The sound pickup according to claim 1, wherein the arrangement configured to adjust the magnetic field includes a first electromagnet and at least one variable resistor that influences the first electromagnet.

3. The sound pickup according to claim 1, wherein the arrangement configured to adjust the magnetic field adjusts a position of the magnet in the coil.

4. The sound pickup according to claim 1,
   wherein the arrangement configured to continuously variably adjust the opening of the cover of the housing includes two perforated plates that are supported at the cover and that include aligned borehole patterns and that are movable relative to each other and that are configured to achieve different openings and damping effects.

5. The sound pickup according to claim 1, wherein the arrangement configured to adjust the magnetic field includes a first permanent magnet and an additional permanent magnet, electromagnet or a component made from ferro magnetic material whose position relative to the first permanent magnet is adjustable.

6. The sound pickup according to claim 5, wherein the adjustable position is adjustable at a right angle relative to an orientation of the strings.

7. The sound pickup according to claim 5, wherein the additional permanent magnet, the electro magnet or the ferro magnetic component is arranged outside of the housing.

8. The sound pickup according to claim 5, wherein the additional permanent magnet, the electromagnet or the ferro magnetic component is arranged within the housing.

9. The sound pickup according to claim 5, the position of the additional permanent magnet, the electromagnet or ferromagnetic component is adjustable manually.

* * * * *